United States Patent
Yoo

(10) Patent No.: US 12,002,041 B2
(45) Date of Patent: Jun. 4, 2024

(54) METHOD AND SYSTEM FOR USER AUTHENTICATION USING VIRTUAL CODE FOR AUTHENTICATION

(71) Applicant: SSENSTONE INC., Seoul (KR)

(72) Inventor: Chang Hun Yoo, Seoul (KR)

(73) Assignee: SSENSTONE INC., Seoul (KR)

( * ) Notice: Subject to any disclaimer, the term of this patent is extended or adjusted under 35 U.S.C. 154(b) by 643 days.

(21) Appl. No.: 17/170,750

(22) Filed: Feb. 8, 2021

(65) Prior Publication Data

US 2021/0185034 A1    Jun. 17, 2021

Related U.S. Application Data

(63) Continuation of application No. PCT/KR2019/009696, filed on Aug. 5, 2019.

(30) Foreign Application Priority Data

Aug. 9, 2018  (KR) .................. 10-2018-0093349
Jun. 18, 2019 (KR) .................. 10-2019-0071944

(51) Int. Cl.
*G06Q 20/38*   (2012.01)
*G06F 1/14*    (2006.01)
(Continued)

(52) U.S. Cl.
CPC ............ *G06Q 20/385* (2013.01); *G06F 1/14* (2013.01); *G06F 12/10* (2013.01); *G06F 21/60* (2013.01);
(Continued)

(58) Field of Classification Search
CPC .. G06Q 20/385; G06Q 20/341; G06Q 20/343; G06Q 20/352; G06Q 20/353;
(Continued)

(56) References Cited

U.S. PATENT DOCUMENTS 6,000,832 A    12/1999  Franklin et al.
7,427,033 B1*  9/2008   Roskind ................ G07F 7/1083
                                                         235/487
(Continued)

FOREIGN PATENT DOCUMENTS

EP    2 118 805 B1    11/2012
KR    10-0213188 B1   8/1999
(Continued)

OTHER PUBLICATIONS

International Search Report issued in PCT/KR2019/009696; dated Nov. 8, 2019.
Office Action issued in KR 10-2019-071944; mailed by the Korean Intellectual Property Office dated May 8, 2020.
(Continued)

*Primary Examiner* — Ayoub Alata
(74) *Attorney, Agent, or Firm* — Studebaker & Brackett PC

(57) ABSTRACT

A method and system for user authentication by using an authentication virtual code are provided. A user authentication method using an authentication virtual code includes receiving, by a server, the authentication virtual code, searching, by the server, for an authentication card storage location, at which the authentication card is registered, in a storage location search algorithm based on the authentication virtual code, identifying, by the server, a user by extracting user information stored after being matched with the found authentication card storage location, verifying, by the server, an authentication virtual code based on a time point at which the authentication virtual code is received, and approving, by the server, user authentication.

14 Claims, 7 Drawing Sheets

(51) Int. Cl.
*G06F 12/10* (2016.01)
*G06F 21/60* (2013.01)
*G06Q 20/34* (2012.01)
*G06Q 20/40* (2012.01)
*H04L 9/40* (2022.01)
*G06K 19/07* (2006.01)

(52) U.S. Cl.
CPC ......... *G06Q 20/341* (2013.01); *G06Q 20/343* (2013.01); *G06Q 20/352* (2013.01); *G06Q 20/353* (2013.01); *G06Q 20/38* (2013.01); *G06Q 20/40* (2013.01); *G06Q 20/401* (2013.01); *G06Q 20/40145* (2013.01); *H04L 63/0838* (2013.01); *H04L 63/0853* (2013.01); *G06F 2212/65* (2013.01); *G06K 19/0701* (2013.01); *G06K 19/0723* (2013.01)

(58) Field of Classification Search
CPC ...... G06Q 20/38; G06Q 20/40; G06Q 20/401; G06Q 20/40145; G06F 1/14; G06F 12/10; G06F 21/60; G06F 2212/65; H04L 63/0838; H04L 63/0853; G06K 19/0701; G06K 19/0723
See application file for complete search history.

(56) References Cited

U.S. PATENT DOCUMENTS

| | | | |
|---|---|---|---|
| 9,727,759 B1* | 8/2017 | Essebag | G06Q 20/4018 |
| 2009/0048971 A1 | 2/2009 | Hathaway et al. | |
| 2009/0159712 A1* | 6/2009 | Mullen | G06K 7/084 |
| | | | 235/493 |
| 2009/0316903 A1 | 12/2009 | Jeung | |
| 2014/0095869 A1 | 4/2014 | Oltmans et al. | |
| 2019/0362339 A1* | 11/2019 | Gurunathan | G06Q 20/3674 |
| 2021/0264403 A1* | 8/2021 | Li | G06Q 20/326 |

FOREIGN PATENT DOCUMENTS

| | | |
|---|---|---|
| KR | 10-1316466 B1 | 10/2013 |
| KR | 10-2015-0005788 A | 1/2015 |
| KR | 10-2015-0072955 A | 6/2015 |
| KR | 10-2016-0036471 A | 4/2016 |
| KR | 10-2016-0100192 A | 8/2016 |
| KR | 10-1675927 B1 | 11/2016 |

OTHER PUBLICATIONS

Communication pursuant to Article 94(3) EPC issued by the European Patent Office dated Sep. 27, 2023, which corresponds to European Patent Application No. 19848662.3-1218 and is related to U.S. Appl. No. 17/170,750.

* cited by examiner

METHOD AND SYSTEM FOR USER AUTHENTICATION USING VIRTUAL CODE FOR AUTHENTICATION

CROSS-REFERENCE TO RELATED APPLICATIONS

The present application is a continuation of International Patent Application No. PCT/KR2019/009696, filed on Aug. 5, 2019, which is based upon and claims the benefit of priority to Korean Patent Application No. 10-2018-0093349 filed with the Korean Intellectual Property Office on Aug. 9, 2018 and Korean Patent Application No. 10-2019-0071944 filed with the Korean Intellectual Property Office on Jun. 18, 2019. The disclosures of the above-listed applications are hereby incorporated by reference herein in their entirety.

TECHNICAL FIELD

Embodiments of the inventive concept described herein relate to a method and system for user authentication by using an authentication virtual code.

BACKGROUND ART

One time password (OTP) refers to a user authentication method that uses an OTP of a randomly-generated random number. An OTP authentication method may be used in a system introduced to strengthen security. Because the OTP authentication method generates the OTP to perform user authentication whenever a user logs in, security weak points caused by repeated use of the same password may be overcome.

A user enters a password when a user logs in. At this time, the conventional OTP authentication method identifies who the user is, generates the OTP by using an OTP function assigned to the user, completes OTP authentication through the OTP. Accordingly, the user needs to log in whenever OTP authentication is performed.

As such, it is necessary to perform user authentication by generating an OTP without login whenever a user requests authentication.

DETAILED DESCRIPTION OF THE INVENTION

Technical Problem

Embodiments of the inventive concept provide a method and system for user authentication by using an authentication virtual code that are capable of performing user authentication without user login by using an authentication virtual code generated based on the tagging of an authentication card.

Furthermore, embodiments of the inventive concept provide a method and system for user authentication by using an authentication virtual code that are capable of providing an authentication virtual code that is newly generated at a unit count interval while not being generated redundantly, whenever user authentication is requested by using an authentication card.

The technical problems to be solved by the present inventive concept are not limited to the aforementioned problems, and any other technical problems not mentioned herein will be clearly understood from the following description by those skilled in the art to which the inventive concept pertains.

Technical Solution

According to an embodiment, a user authentication method using an authentication virtual code includes receiving, by a server, the authentication virtual code, searching, by the server, for an authentication card storage location, at which the authentication card is registered, in a storage location search algorithm based on the authentication virtual code, identifying, by the server, a user by extracting user information stored after being matched with the found authentication card storage location, verifying, by the server, the authentication virtual code based on a time point at which the authentication virtual code is received, and approving, by the server, user authentication. The authentication virtual code is generated by an authentication virtual code generation function included in an authentication virtual code generation program based on authentication card data provided from an authentication card. The storage location search algorithm is matched with the authentication virtual code generation function and searches for the authentication card storage location based on at least one detailed code in the authentication virtual code.

Furthermore, the authentication virtual code may be generated based on time data at which the authentication card data included in the authentication card is provided to the authentication virtual code generation program, or time data at which the user authentication is requested by tagging the authentication card to the authentication virtual code generation program.

Moreover, the authentication virtual code may be generated based on a combination serial number obtained by combining an authentication card serial number included in the authentication card data and a serial number included in the authentication virtual code generation program.

Also, the method may further include registering, by the server, the authentication card by using the authentication card data and user information of a user holding the authentication card. The registering of the authentication card may include searching, by the server, for a specific authentication card storage location within the storage location search algorithm based on an authentication card registration time point and storing the user information at the found authentication card storage location to complete registration.

Besides, the verifying of the authentication virtual code may include comparing, by the server, a time point, at which the received authentication virtual code is received, with a time point, at which the authentication virtual code generated by using the authentication virtual code generation function is generated by the authentication virtual code generation program and determining that the received authentication virtual code is a normal code when the generation time point is included within an error range from the reception time point.

In addition, the authentication virtual code may include a first code and a second code that are changed for each unit count set to a specific time interval. The first code may be generated based on a unit count elapsing from a first time point at which the server starts an issuance of the authentication card, and the second code may be generated based on a unit count elapsing from a time point at which the authentication card of a specific user is registered.

According to an embodiment, a user authentication program using an authentication virtual code is stored in a medium to execute a user authentication method using the authentication virtual code in combination with a computer that is a piece of hardware.

According to an embodiment, an authentication virtual code generation device for user authentication includes a detailed code generation unit generating one or more detailed codes based on authentication card data provided from an authentication card of a user, an authentication virtual code generation unit generating an authentication virtual code by combining the one or more detailed codes by using an authentication virtual code generation function, and an authentication virtual code provision unit transmitting the generated authentication virtual code to a server and requesting the user authentication. The authentication virtual code is generated based on time data, at which the authentication card data included in the authentication card is provided, or time data at which the user authentication is requested by tagging the authentication card, and a combination serial number obtained by combining an authentication card serial number included in the authentication card data and a serial number of an authentication virtual code generation program included in the authentication virtual code generation device.

According to an embodiment, an authentication virtual code verification device for user authentication includes an authentication virtual code reception unit receiving an authentication virtual code and to receive a request for the user authentication, a detailed code extraction unit extracting one or more detailed codes included in the authentication virtual code, a storage location search unit searching for an authentication card storage location, at which an authentication card is registered in a storage location search algorithm, based on the extracted one or more detailed codes, a user information extraction unit identifying a user by extracting user information stored after being matched with the found authentication card storage location, an authentication virtual code verification unit comparing a time point, at which the authentication virtual code reception unit receives the authentication virtual code, with a time point, at which the authentication virtual code is generated by using an authentication virtual code generation function by an authentication virtual code generation means, and verifying the authentication virtual code, and a user authentication approval unit approving the user authentication when verification of the authentication virtual code is completed. When it is identified by the authentication virtual code verification unit that the generation time point is within an error range from the reception time point, and it is determined that the authentication virtual code is a normal code, the user authentication is approved by the user authentication approval unit. The storage location search algorithm is matched with the authentication virtual code generation function.

According to an embodiment, an authentication card device for user authentication includes an IC chip including authentication card data and a communication unit providing the authentication card data to an authentication virtual code generation means through wireless communication. The authentication card data is specific data assigned to the authentication card device when the authentication card device is manufactured. The authentication virtual code generation means generates an authentication virtual code based on the received authentication card data by using an authentication virtual code generation function and provides the generated authentication virtual code to a server. The server searches for an authentication card storage location, at which the authentication card device is registered, in a storage location search algorithm matched with the authentication virtual code generation function based on the provided authentication virtual code, and extracts user information stored after being matched with the authentication card storage location to identify a user. The server compares a time point, at which the authentication virtual code is received, with a time point, at which the authentication virtual code generated by using the authentication virtual code generation function is generated by the authentication virtual code generation means, and approves the user authentication by determining that the received authentication virtual code is a normal code when the generation time point is included within an error range from the reception time point.

Furthermore, the authentication card device may further include a determination unit distinguishing between a tag for payments and a tag for the user authentication when the authentication card device includes a card for the payments. The communication unit may provide a payment terminal with card information for the payments included in the IC chip when the tag for the payments is determined by the determination unit. The communication unit may provide the authentication virtual code generation means with the authentication card data for generating the authentication virtual code when the tag for the user authentication is determined by the determination unit.

Moreover, the authentication card device may further include a determination unit distinguishing between a tag for access and a tag for the user authentication when the authentication card device is used as a card for access. The communication unit may provide an access terminal with identification information for the access included in the IC chip when the tag for the access is determined by the determination unit. The communication unit may provide the authentication virtual code generation means with the authentication card data for generating the authentication virtual code when the tag for the user authentication is determined by the determination unit.

Advantageous Effects of the Invention

The inventive concept has the following various effects.

First, it is possible to provide an authentication virtual code that is newly generated at a unit count interval while not being generated redundantly whenever user authentication is requested by using an authentication card.

Second, it is possible to determine whether an authentication virtual code generated by an authentication virtual code generation device is a code generated at a current time point, by comparing a generation time of an authentication virtual code newly generated at a unit count interval by an authentication virtual code generation device with a reception time of an authentication virtual code at which an authentication virtual code is received by the authentication virtual code verification device. That is, it is possible to determine whether a user has requested user authentication by using an authentication virtual code generated at the current time point, using an authentication card.

Third, it is possible to identify who a user who has requested authentication is without logging in separately when user authentication is requested, by extracting user information stored in the authentication virtual code verification device by using the authentication virtual code generated based on the tagging of an authentication card.

Fourth, as a redundant authentication virtual code does not appear within the specified period because a new authentication virtual code is generated for each unit count, or an order in which the authentication virtual code capable of extracting user information is generated by an authentication virtual code verification device is randomized, the user information is not leaked even when the authentication virtual code is leaked.

Fifth, an authentication virtual code generation function may be stored in an authentication virtual code generation device (e.g., a user terminal) that generates an authentication virtual code. The user information may be extracted by using the authentication virtual code. An algorithm for verifying the authentication virtual code may be added to the authentication virtual code verification device (e.g., a server, or the like) that verifies whether the authentication virtual code is a normal code. Accordingly, an algorithm for generating and verifying the authentication virtual code may be prevented from being leaked.

The effects of the present inventive concept are not limited to the aforementioned effects, and other effects not mentioned herein will be clearly understood from the following description by those skilled in the art to which the inventive concept pertains.

BEST MODE

Figure 1:
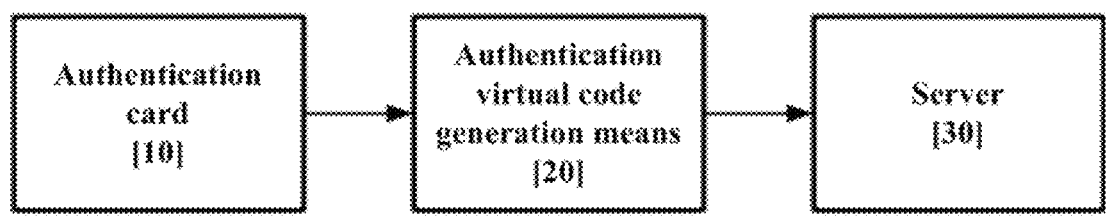
FIG. 1 is a block diagram of a user authentication system by using an authentication virtual code according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the concept of the inventive concept to those skilled in the art. The inventive concept may be defined by scope of the claims.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements. The same reference numerals denote the same elements throughout the specification. As used herein, the term "and/or" includes any and all combinations of one or more of the associated components. It will be understood that, although the terms "first", "second", etc., may be used herein to describe various components, these components should not be limited by these terms. These terms are only used to distinguish one component from another component. Thus, a first component discussed below could be termed a second component without departing from the teachings of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

In this specification, 'user authentication' refers to a procedure for authorizing a user to pass through an area requiring security, such as access, login, financial transactions, or the like.

In this specification, a 'financial transaction' refers to the procedure that takes place between finance companies. The 'financial transaction' includes card payments, deposits or withdrawals from a bank account, or the like.

In this specification, a 'character' is a component of a code and includes all or part of uppercase alphabet characters, lowercase alphabet characters, numerals, and special characters.

In this specification, a 'code' refers to a string of characters.

In this specification, an 'authentication card' refers to a card for generating an authentication virtual code, and includes a separate card number or an identification number (e.g., a serial number).

In this specification, an 'authentication virtual code' refers to a code generated based on information provided from an authentication card by an authentication virtual code generation means, and means a code used when an authentication virtual code verification means performs user authentication by extracting user information. That is, an 'authentication virtual code' refers to a virtual code temporarily assigned for each unit count to extract and verify the user information.

In this specification, a 'detailed code' refers to a part of codes included in the authentication virtual code.

In this specification, the 'unit count' refers to a unit that is set to a specific time interval and defined to change as a time interval elapses. For example, 1 count may be used after being set to a specific time interval (e.g., 1.5 seconds).

In this specification, an 'authentication virtual code generation function' refers to a function used to generate an authentication virtual code.

In this specification, 'rolling movement' means that an object performs both rotational and translational movements. That is, the 'rolling movement' moves while performing both rotational and translational movements, and means that each point of the rotating object moves in contact with the moving axis sequentially.

In this specification, a 'storage location' refers to a point (count) on a track corresponding to a point in time when the registration of the authentication card is requested by a user.

Hereinafter, embodiments of the inventive concept will be described in detail with reference to accompanying drawings.

FIG. 1 is a block diagram of a user authentication system by using an authentication virtual code according to an embodiment of the inventive concept.

As shown in FIG. 1, a user authentication system includes an authentication card 10, an authentication virtual code generation means 20, and a server 30.

The authentication card 10 may transmit information included therein to the authentication virtual code generation means 20 and then may allow the authentication virtual code generation means 20 to generate an authentication virtual code.

In an embodiment, as the authentication card 10 communicates with the authentication virtual code generation means 20, the authentication card 10 transmits information necessary to generate the authentication virtual code. For example, as the authentication card 10 communicates with the authentication virtual code generation means 20 through near field communication (NFC), the authentication card 10 contacts one side of the authentication virtual code generation means 20 to transmit data included in the authentication card 10 to the authentication virtual code generation means 20. Hereinafter, a method in which the authentication virtual code generation means 20 uses data provided by the authentication card 10 will be described in detail.

Furthermore, in an embodiment, the authentication card 10 may be initially registered in the server 30. The method for initially registering the authentication card 10 in the server 30 will be described in detail later.

In an embodiment, the authentication card 10 may be an empty card including authentication card data, and may be used only when user authentication is required for security. At the time of user authentication, the authentication card 10 provides authentication card data to the authentication virtual code generation means 20 (e.g., a user terminal) and then allows a dedicated program built or installed in the authentication virtual code generation means 20 to generate the authentication virtual code. At this time, a user may separately purchase the authentication card 10. For example, the user may purchase and employ the authentication card 10 of the desired design at a mart or convenience store.

Besides, in an embodiment, the authentication card 10 may be used as an authentication card for financial transactions. That is, the authentication card 10 may be used as a card for making a general payment, for example, a credit card or a check card. At the same time, when security authentication is required during financial transactions, the authentication card 10 may be used as a card to generate an authentication virtual code. During financial transactions, the authentication card 10 provides authentication card data to the authentication virtual code generation means 20 (e.g., a user terminal) and then allows a dedicated program built or installed in the authentication virtual code generation means 20 to generate the authentication virtual code. At this time, the authentication card 10 for financial transactions may be received and used by a financial company, or the like. For example, a specific financial company or a card issuer may provide a user with the authentication card 10 for financial transactions by including a function to generate an authentication virtual code in a general payment card such that the user who employs a card issued by the specific financial company or the card issuer is capable of safely utilizing a service.

Besides, in another embodiment, the authentication card 10 may be used as an authentication card for access. That is, the authentication card 10 may be used as a card for general access, for example, a pass, an employee ID, or the like. At the same time, the authentication card 10 may be used as a card to generate an authentication virtual code when security authentication is required to access a system or space requiring security. When a user enters a secure area, the authentication card 10 provides authentication card data to the authentication virtual code generation means 20 (e.g., a user terminal or a security device) and then allows a dedicated program built or installed in the authentication virtual code generation means 20 to generate the authentication virtual code. At this time, when a user moves into a new house or when the user belongs to a specific group, such as getting a job at a company, the authentication card 10 for access may be an access card issued by an administrator of the corresponding group, may be used to allow access to a specific space, and may be used for user authentication when the user enters a security-required area within a specific space.

Moreover, in an embodiment, when the authentication card 10 is manufactured, the authentication card data including an authentication card number, an authentication card serial number, and the like is assigned to the authentication card 10. Furthermore, in an embodiment, the authentication card 10 only includes authentication card data therein and does not expose the authentication card data (e.g., the authentication card number) to the outside.

The authentication virtual code generation means 20 refers to a device, in which a dedicated program or dedicated application (hereinafter, referred to as a "dedicated program") for generating the authentication virtual code based on the tagging of the authentication card 10 is built or installed.

In an embodiment, the dedicated program may receive the authentication card data by communicating with the authentication card 10. That is, the authentication virtual code generation means 20 receives the authentication card data by performing wireless communication (e.g., NFC communication according to proximity) with the authentication card 10.

Furthermore, in an embodiment, the dedicated program generates the authentication virtual code for user authentication by using the authentication card data received from the authentication card 10. That is, the dedicated program includes an authentication virtual code generation function to generate the authentication virtual code by using all or part of the authentication card data received from the authentication card 10. For example, the dedicated program generates the authentication virtual code by using an authentication card serial number included in the authentication card data, as seed data of the authentication virtual code generation function. Furthermore, for example, the dedicated program may use a combination serial number, which is obtained by combining the authentication card serial number received from the authentication card 10 with the serial number of the dedicated program, as the seed data of the authentication virtual code generation function.

Furthermore, in an embodiment, the dedicated program registers the authentication card 10 in the server 30. That is, the user purchases the authentication card 10 or receives the authentication card 10 from a card issuer, and registers the authentication card 10 in the dedicated program built or installed in the authentication virtual code generation means 20 (i.e., a user terminal). The dedicated program registers the authentication card 10 in the server 30 by transmitting authentication card data and user information to the server 30.

For example, the dedicated program receives authentication card data including a serial number and an authentication card number from the authentication card 10 upon registering an authentication card. Furthermore, upon registering an authentication card, the dedicated program receives user information from the user or generates the user information based on the user's login information of the dedicated program. Afterwards, the dedicated program transmits the authentication card data and the user information to the server 30. As the server 30 registers the authentication card 10 at a specific count, the dedicated program receives an authentication virtual code generation function or setting data for specifying the authentication virtual code generation function, from the server 30. In this way, the dedicated program may include an authentication virtual code generation function to generate an authentication virtual code capable of searching for a specific count at which an authentication card is registered in the server 30.

The server 30 searches for a location at which the authentication card 10 is registered in the server 30 and then extracts the user information stored at the corresponding location, based on the authentication virtual code generated by the authentication virtual code generation means 20. Besides, the server 30 verifies the authentication virtual code based on a point in time when the authentication virtual code is received and a point in time when the authentication virtual code is generated by the authentication virtual code generation means 20. A method of performing user authentication by verifying the authentication virtual code will be described in detail later.

Also, the server 30 stores the user information provided by the dedicated program or the user information previously stored in the server 30 at a point corresponding to a specific count, at which the registration of the authentication card 10 is requested, and then initially registers the authentication card 10. The method of initially registering the authentication card 10 in the server 30 will be described in detail later.

In an embodiment, the server 30 stores the authentication card data and user information, which are provided by the dedicated program, at a specific count corresponding to a point in time, when the authentication card is registered, at the request of the dedicated program. Herein, the user information may refer to information entered by a user through the dedicated program built or installed in the user terminal, or information generated based on the user's login information of the dedicated program.

Figure 2:
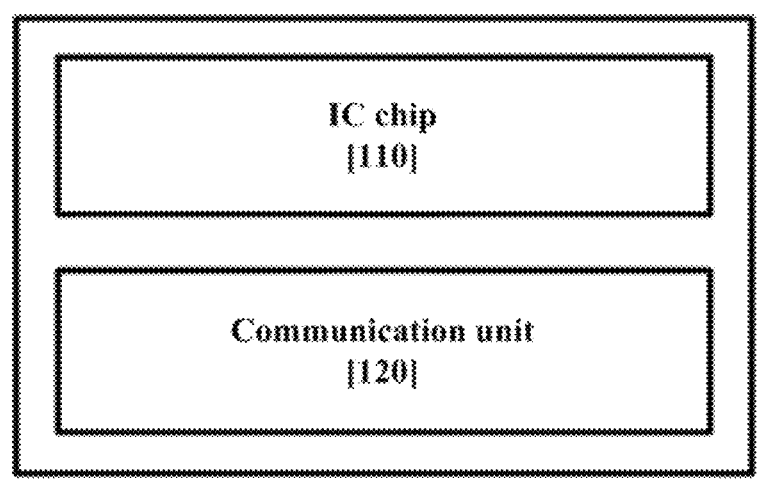
FIG. 2 is a block diagram of an authentication card device according to an embodiment of the inventive concept.

FIG. 2 is a block diagram of an authentication card device according to an embodiment of the inventive concept.

As illustrated in FIG. 2, an authentication card device 100 includes an integrated circuit (IC) chip 110 and a communication unit 120.

Herein, the authentication card device 100 refers to the authentication card 10 contacting an authentication virtual code generation device 200 for user authentication The IC chip 110 refers to a metal chip disposed on a front surface of the authentication card device 100 and includes authentication card data of the authentication card device 100. Herein, the authentication card data refers to data including an authentication card number, an authentication card serial number, or the like.

The communication unit 120 communicates with the authentication virtual code generation device 200 to provide the authentication card data. Herein, in addition to Near Field Communication (NFC), the wireless communication scheme of the communication unit 120 may include Bluetooth, Bluetooth Low Energy (BLE), Beacon, Radio Frequency Identification (RFID), Infrared Data Association (IrDA), Ultra Wideband (UWB), ZigBee, or the like.

For example, the communication unit 120 may be an NFC communication unit (e.g., an NFC antenna) connected to the IC chip 110. That is, as the authentication card device 100 approaches the authentication virtual code generation device 200 capable of performing NFC communication, the authentication card device 100 may transmit the authentication card data stored in the IC chip 110, to the authentication virtual code generation device 200. In this way, the dedicated program in the authentication virtual code generation device 200 may perform a procedure of generating the authentication virtual code based on the authentication card data or registering the authentication card 10 in the server 30.

In an embodiment, when the authentication card device 100 includes a payment function, the authentication card device 100 may further include a determination unit (not shown) that determines whether the authentication card device 100 is used for payments or user authentication. That is, the determination unit may distinguish between a card tag for making a payment and a card tag for user authentication, and then may transmit different card data depending on cases.

For example, when the determination unit determines that the authentication card device 100 is tagged to a payment terminal, the determination unit may provide payment card information (e.g., a payment card number or a payment serial number) stored in the IC chip 110 to the payment terminal. Furthermore, when the determination unit determines that the authentication card device 100 is tagged to the authentication virtual code generation means 20 (i.e., a user terminal) for user authentication during financial transactions, the determination unit may provide the authentication card data (e.g., a serial number of an authentication card) necessary to generate the authentication virtual code to the dedicated program built or installed in the user terminal. In this case, the payment serial number may be identical to or different from the serial number of the authentication card.

Also, for another example, when being tagged to a specific device, the authentication card device 100 may provide a card number without distinguishing between a case where the authentication card device 100 is tagged to the payment terminal and a case where the authentication card device 100 is tagged to a user terminal with the dedicated program that is built or installed therein. At this time, the payment terminal makes a payment by using the provided card number. On the other hand, the dedicated program may determine that the provided card number is a card number authenticated (registered) in a program, and then may fetch a serial number for user authentication from a storage area in the authentication card device 100.

In another embodiment, when the authentication card device 100 includes an access function, the authentication card device 100 may further include the determination unit (not shown) that determines whether the authentication card device 100 is used for access or user authentication. That is, the determination unit may distinguish between a card tag for general access and a card tag for user authentication, and then may transmit different card data depending on cases.

For example, when determining that the authentication card device 100 is tagged to a general access device, the determination unit may provide the access device with identification information for access included in the IC chip 110, for example, user identification information, user code, and the like. Furthermore, when determining that the authentication card device 100 is tagged to the authentication virtual code generation means 20 (i.e., a user terminal) for user authentication upon accessing a secure area, the determination unit may provide the dedicated program built or installed in the user terminal with the authentication card data (e.g., a serial number of an authentication card) necessary to generate the authentication virtual code. At this time, the authentication card data required to generate the authentication virtual code may be the same as an identification code used for general access.

Figure 3:
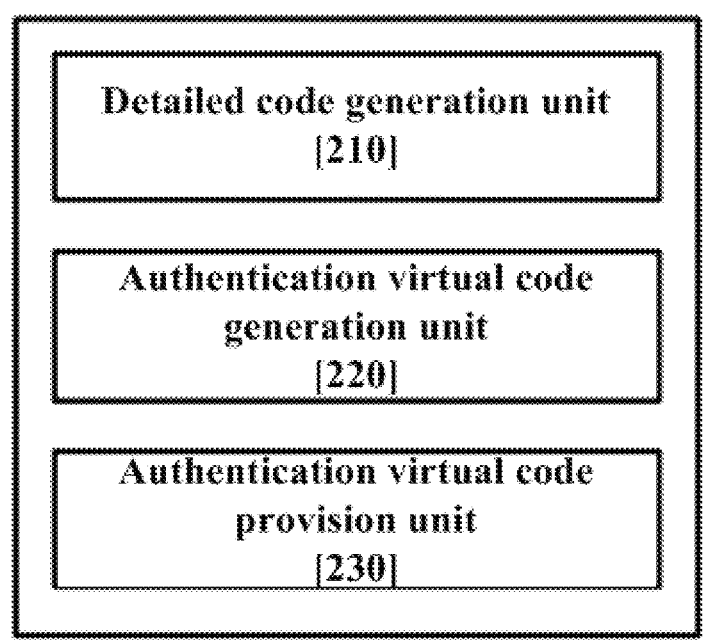
FIG. 3 is a block diagram of an authentication virtual code generation device according to an embodiment of the inventive concept.

FIG. 3 is a block diagram of an authentication virtual code generation device according to an embodiment of the inventive concept.

As illustrated in FIG. 3, the authentication virtual code generation device 200 includes a detailed code generation unit 210, an authentication virtual code generation unit 220, and an authentication virtual code provision unit 230.

In an embodiment, the authentication virtual code generation device 200 may be a user terminal in which a program (i.e., an application) that generates an authentication virtual code for user authentication is installed.

The detailed code generation unit 210 generates one or more detailed codes based on authentication card data provided through wireless communication by the authentication card device 100.

An authentication virtual code generation function includes one or more detailed code generation functions. For example, when the authentication virtual code includes a plurality of detailed codes, the authentication virtual code generation function generates the plurality of detailed codes by using the plurality of detailed code generation functions and generates an authentication virtual code by using a detailed code combination function to combine the plurality of detailed codes.

At this time, the authentication virtual code is generated for each unit count by the dedicated program built or installed in the authentication virtual code generation device 200 (i.e., a user terminal), and refers to a mobile one time password (mOTP).

In an embodiment, the authentication virtual code generation device 200 may use a serial number of an authentication card provided from the authentication card device 100, as one of seed data of an authentication virtual code generation function. For example, the detailed code generation unit 210 generates each detailed code by using a combination serial number, which is obtained by combining a serial number of an authentication card provided by the authentication card device 100 with the serial number of the dedicated program built or installed in the authentication virtual code generation device 200, as seed data of each detailed code generation function by using one detailed code generation function. At this time, the detailed code generation unit 210 may generate each detailed code by using a time point or a count value at which user authentication is requested by a user.

In an embodiment, the detailed code generation unit 210 includes a first function and a second function as detailed code generation functions to generate a first code and a second code. At this time, the authentication virtual code generation device 200 may only include the first function to generate the first code and the second function to generate the second code as detailed code generation functions to improve security, and may not include data associated with a correlation between the first code and the second code.

The authentication virtual code generation unit 220 combines one or more detailed codes by using an authentication virtual code generation function and then generates an authentication virtual code. In an embodiment, the authentication virtual code may be generated by combining a plurality of detailed codes depending on a specific rule. The authentication virtual code generation function includes a rule (i.e., the detailed code combination function) that combines a plurality of detailed codes. That is, the authentication virtual code generation unit 220 may combine one or more detailed codes by using the detailed code combination function included in the authentication virtual code generation function.

Various methods may be applied to the method of generating one authentication virtual code by combining the plurality of detailed codes. As an example of the detailed code combination function, the authentication virtual code generation unit 220 may generate the authentication virtual code in the manner of alternately positioning the first code of N-digits and the second code of N-digits. Furthermore, for another example, the detailed code combination function may be a function to combine the second code behind the first code. As the length of the detailed code included in the authentication virtual code increases, the detailed code combination function may be generated variously.

Furthermore, in an embodiment, when the authentication virtual code is generated through the combination according to the specific rule of the first code and the second code, the first code and the second code may be used to search for a storage location of the authentication card, at which user information is stored, in a storage location search algorithm. For example, the first code is set to a start point at which a storage location is found, and the second code is set to a search path from the start point to the storage location of the authentication card depending on a specific search method. That is, when the authentication virtual code generated normally for each unit count is provided by the authentication virtual code generation device 200, an authentication virtual code verification device 300 determines that a point moving along a search path corresponding to the second code from a search start point corresponding to the first code is a point (a storage location of the authentication card) at which user information is stored. The detailed method of searching for the storage location of the authentication card based on the first code and the second code constituting the authentication virtual code will be described later.

In an embodiment of a method in which the detailed code generation unit 210 generates the detailed code, the detailed code generation unit 210 generates a new detailed code for each unit count, and thus the authentication virtual code generation device 200 generates a new authentication virtual code for each unit count. The authentication virtual code newly generated for each unit count is not generated redundantly. In particular, the detailed code generation unit 210 may be configured such that the authentication virtual code newly generated for each unit count is not redundantly generated between users belonging to a specific group as well as not being generated during a specified duration for a specific user or the specific authentication virtual code generation device 200.

In the detailed embodiment of preventing an authentication virtual code from being generated redundantly, when generating the first code or the second code of N digits by using M characters, the detailed code generation function included in the authentication virtual code generation function may generate $M^N$ codes as the first code or the second code and may match each code for each count from an initial time point at which the detailed code generation function is operated. For example, when setting a unit count to 1 second, the detailed code generation function matches $M^N$ different codes every second from the first operating time point. Moreover, when a period of using the specific detailed code generation function or a usage period (e.g., the expiration date of a user terminal where an application generating the authentication virtual code is installed) of the authentication virtual code generation device 200 is set to be shorter than a time length (e.g., MN seconds in the case where 1 count is 1 second) corresponding to MN counts, the first code or the second code is not generated redundantly to be the same as each other during the usage period. That is, when a count increases with time, in the case where a user requests the authentication virtual code generation device 200 to generate the authentication virtual code by contacting an authentication card at a specific time point, the authentication virtual code generation device 200 may generate a code value matched to a count corresponding to a specific time point, as the first code or the second code.

In particular, when alphabetic uppercase characters and numbers from 0 to 9 are used as characters capable of being included in a code (i.e., using 36 characters) and 6 digits are respectively assigned to first and second codes, the authentication virtual code generation device 200 may provide $36^6$ codes as the first code and the second code. At this time, the authentication virtual code generation device 200 may provide the first code and the second code, which are changed for each count, by matching each code for each count.

In the detailed embodiment of preventing the authentication virtual code from being generated redundantly, when the usage period of the authentication virtual code generation device 200 elapses, the authentication virtual code, of which the usage period is different from the previous usage period, may be generated by changing a function (i.e., a first function or a second function) to generate the first code or the second code or by changing the matching relationship between the first code and the second code. In the case where the first code generated by the first function and the second code generated by the second function are combined in the authentication virtual code, when the first code generation function or the second code generation function are changed, the authentication virtual code generation device 200 may apply, to a new usage period, the authentication virtual code generation function to generate the authentication virtual code, of which the period is different from the previous period, as an order in which the first code or the second code appears differs from an order in the previous usage period. Furthermore, the authentication virtual code generation device 200 may select the first function and the second function such that a code the same as the authentication virtual code used in the previous usage period does not appear as an authentication virtual code at each count in a new usage period (i.e., such that the matching relationship between the first code generated depending on the first function and the second code generated depending on the second function is not included in the matching relationship included in the previous usage period, at all counts in the new usage period). That is, after a usage period, in which MN codes are capable of being applied once, elapses, the authentication virtual code generation function, which does not generate an authentication virtual code, in a new usage period overlapping the previous usage period may be applied by adjusting of updating the authentication virtual code generation function.

Furthermore, in the detailed embodiment of preventing an authentication virtual code from being generated redundantly, the first code may be set to a code value corresponding to a time point (or count) at which the generation of an authentication virtual code is requested, among codes matched for each count from an initial time point at which the first function is operated, and the second code may be set to a code value generated by reflecting a value (i.e., a device identification value) that is always differently present at the same time point for each of the authentication cards 10 such that a redundant authentication virtual code is not generated in the entire period regardless of users. The authentication virtual code may be used as a code value obtained by combining the first code and the second code. Because the first code has a different code value for each count and the second code has a different code value for each of the authentication cards 10 at the same time point, the authentication virtual code obtained by combining the first code and the second code may be output as a different code value for all of the authentication cards 10 at all-time points.

Furthermore, in another embodiment, one of a plurality of listing rules that list M characters in ascending order may be applied to the authentication virtual code generation function (or a detailed code generation function). That is, the authentication virtual code generation device 200 may variously apply rules, which list M characters in ascending order, to the detailed code generation function included in the authentication virtual code generation function. For example, the listing rule that lists uppercase alphabetic characters in ascending order may be an order of A, B, C, . . . , and Z that is a general order or may be an order of A, C, B, . . . , and Z. As a listing rule is changed by the authentication virtual code generation function, the order, in which codes are matched sequentially to each count, is changed from an initial time point at which the authentication virtual code generation function is operated.

The authentication virtual code provision unit 230 requests user authentication by providing the generated authentication virtual code to the server 30.

In an embodiment, the authentication virtual code provision unit 230 may output the authentication virtual code to the outside. For example, when a user desires to perform user authentication based on the authentication virtual code at the time of making a payment, the authentication virtual code provision unit 230 outputs the authentication virtual code on a screen such that the user visually identifies the authentication virtual code or copies the authentication virtual code and then pastes the copied authentication virtual code onto another program or web page. That is, the user may provide the authentication virtual code to a financial institution server by pasting the authentication virtual code output on a screen of the authentication virtual code generation means 20 onto a program or web page.

For another example, when a user desires to perform user authentication based on the authentication virtual code at the time of accessing a specific space, the authentication virtual code provision unit 230 outputs the authentication virtual code on a screen such that the user visually identifies the authentication virtual code or copies the authentication virtual code and then pastes the copied authentication virtual code onto another program or web page. Alternatively, the authentication virtual code provision unit 230 may output the authentication virtual code on a screen such that the user is capable of providing the authentication virtual code output on the screen of the authentication virtual code generation means 20 to a security device installed in a secure area through NFC, or the like.

Figure 4:
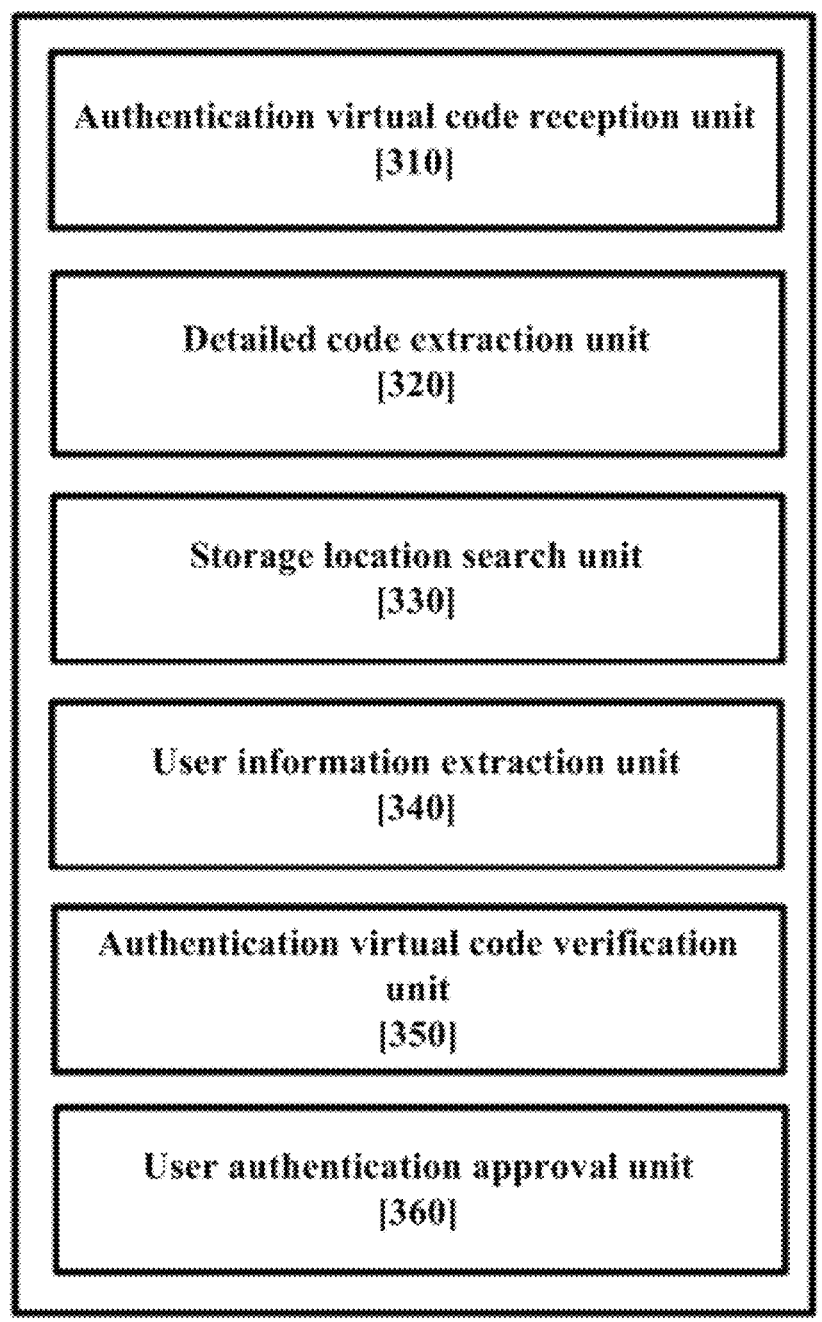
FIG. 4 is a block diagram of an authentication virtual code verification device according to an embodiment of the inventive concept.

FIG. 4 is a block diagram of an authentication virtual code verification device according to an embodiment of the inventive concept.

As illustrated in FIG. 4, the authentication virtual code verification device 300 includes an authentication virtual code reception unit 310, a detailed code extraction unit 320, a storage location search unit 330, a user information extraction unit 340, an authentication virtual code verification unit 350, a user authentication approval unit 360.

Herein, the authentication virtual code verification device 300 refers to a server that extracts user information of a user holding an authentication card based on the authentication virtual code and performs user authentication by determining whether the received authentication virtual code is a normal code, based on the authentication virtual code.

The authentication virtual code reception unit 310 receives a request for user authentication based on an authentication virtual code provided from the authentication virtual code provision unit 230.

In an embodiment, in a case of user authentication at the time of making a payment, the authentication virtual code reception unit 310 receives the authentication virtual code generated by a dedicated program built or installed in a user terminal through an app of a financial company, and then may receive a request for user authentication. In an embodiment, in a case of user authentication at the time of accessing a specific space, the authentication virtual code reception unit 310 receives the authentication virtual code generated by a dedicated program built or installed in the user terminal from a security device or a security system server, and may receive a request for user authentication.

The detailed code extraction unit 320 extracts one or more detailed codes included in the authentication virtual code.

In an embodiment, the detailed code extraction unit 320 includes a detailed code combination function included in the authentication virtual code generation function. Accordingly, when the authentication virtual code includes a plurality of detailed codes, the detailed code extraction unit 320 may extract a plurality of detailed codes from the authentication virtual code by applying the detailed code combination function. For example, when the authentication virtual code generation device 200 generates the authentication virtual code obtained by combining two detailed codes (i.e., the first code and the second code), the detailed code extraction unit 320 may separate the first code and the second code by applying the detailed code combination function to the character string array of the authentication virtual code.

The storage location search unit 330 searches for a storage location at which an authentication card is registered in a storage location search algorithm, based on the extracted one or more detailed codes. Herein, the storage location search algorithm is matched with the authentication virtual code generation function used when the authentication virtual code generation device 200 generates the authentication virtual code. Various methods may be applied to a method in which the storage location search unit 330 searches for a storage location of an authentication card based on each detailed code. The storage location search unit 330 may include a correlation between detailed codes to search for a storage location based on a plurality of detailed codes.

Herein, the 'storage location' refers to a point (count) on a track corresponding to a point in time when the registration of the authentication card is requested by a user. That is, when a track for the corresponding authentication card is operated in a server, and the registration of a specific authentication card is requested by a specific user at a specific time, the corresponding authentication card is registered at a count (i.e., a count that has elapsed from the final driving on a track to a registration time point) corresponding to the corresponding time point. Besides, information of a user employing the corresponding authentication card is matched and stored in a storage location of the corresponding authentication card.

In an embodiment of having a correlation between detailed codes, when the authentication virtual code is composed of the first code and the second code, the storage location search unit 330 may determine a search start point corresponding to the first code and may search for a point, which is moved along a search path corresponding to the second code from the search start point, as the storage location of the authentication card. That is, the detailed code may include the first code for setting the start point of a storage location search and the second code for setting the search path from the start point to the storage location of the authentication card, depending on the specific search method.

Furthermore, in another embodiment, as the authentication virtual code generation device 200 provides a new authentication virtual code for each unit count, the authentication virtual code verification device 300 may set the search start point and the search path based on the first code and the second code, which are changed for each count, to search for a storage location of the authentication card (i.e., a location at which an authentication card is registered).

Furthermore, in another embodiment, to search for a storage location of the authentication card by using a plurality of detailed codes having the correlation, the storage location search unit 330 may include the storage location search algorithm. The storage location search algorithm refers to an algorithm capable of searching for the storage location upon applying each detailed code included in the authentication virtual code, and is matched with the authentication virtual code generation function used when the authentication virtual code generation device 200 generates the authentication virtual code.

For example, in the case where the authentication virtual code includes the first code for determining a search start point of the storage location and the second code for presenting a storage location direction from the search start point, when allowing a direction to be changed to a direction corresponding to the second code at a point corresponding to the first code, the storage location search algorithm refers to an algorithm that adjusts the storage location with which the registration time point of the authentication card is matched to be positioned at the corresponding location.

The user information extraction unit 340 extracts user information that is stored after being matched with the storage location of the authentication card found by the storage location search unit 330. That is, the authentication virtual code verification device 300 may store the user information for using the corresponding authentication card at a storage location of each authentication card in the storage location search algorithm, and thus the user information extraction unit 340 may extract specific user information that is stored after being matched with a specific authentication card storage location within the storage location search algorithm. Accordingly, it is possible to identify who a user making a request for user authentication is, without the need to log in separately during user authentication.

As using the storage location search algorithm, even though the first code and the second code that are included in the authentication virtual code are changed, the authentication virtual code verification device 300 may search for the storage location of an authentication card (i.e., the registration count of the authentication card) to extract user information that is stored after being matched at the corresponding storage location. Various methods may be applied to the storage location search algorithm, and the detailed exemplification thereof will be described later. However, the storage location search algorithm is not limited to the exemplification described below.

Figure 6:
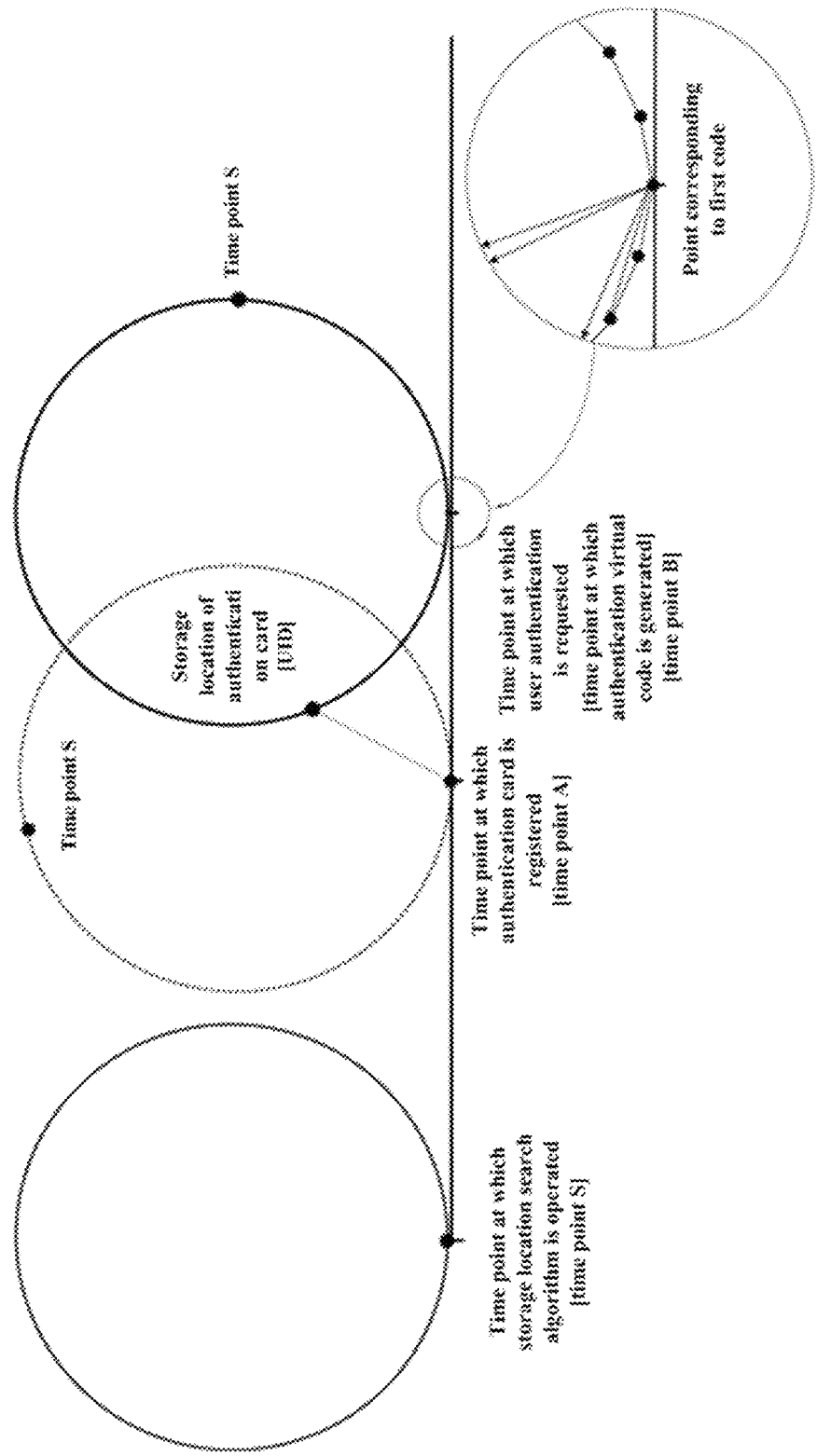
FIG. 6 is an exemplary view illustrating a storage location search algorithm searching for a storage location of an authentication card through rolling movement of a k-polygon, according to an embodiment of the inventive concept.

For example, referring to FIG. 6, when the storage location search algorithm is a k-polygon ('k' is MN) that performs rolling movement along a track on which MN codes corresponding to the first code is listed, and when a vertex of the k-polygon moves while corresponding to a point at which a code is positioned on a first code track, each vertex of the k-polygon is matched to a storage location of an authentication card and a point at which the first code track (e.g., a first track) corresponds to the k-polygon is a storage location search start point corresponding to the first code. At this time, the storage location search unit 330 may apply rolling movement to the k-polygon such that the vertex of the k-polygon is in contact with the point corresponding to the first code extracted by the detailed code extraction unit 320. As such, as the storage location search unit 330 allows an angle to be changed to an angle (e.g., a specific angle obtained by dividing 180 degrees into MN pieces so as to face the vertex of the k-polygon) corresponding to the second code at a location on the first track, which the k-polygon contacts, the storage location search unit 330 may search for the vertex of the k-polygon that is a storage location at which the authentication card corresponding to an authentication virtual code is stored.

In particular, as illustrated in FIG. 6, the authentication virtual code verification device 300 may perform rolling movement (i.e., moving each vertex of the k-polygon while each vertex of the k-polygon sequentially contacts each point on the track) on the k-polygon to a point corresponding to the first code. Afterward, the authentication virtual code verification device 300 allows an angle direction to be changed to an angle direction corresponding to the second code to search for a vertex corresponding to the storage location.

After the storage location search unit 330 searches for a storage location of the authentication card or a registered location of the authentication card by using the first code and the second code in the authentication virtual code within the storage location search algorithm, the user information extraction unit 340 extracts user information stored at the corresponding location.

Various storage location search algorithms will be described in detail later.

The authentication virtual code verification unit 350 verifies the authentication virtual code by comparing a point in time when the authentication virtual code reception unit 310 receives the authentication virtual code with a point in time when the authentication virtual code is generated by using the authentication virtual code generation function by an authentication virtual code generation means (i.e., a user terminal).

Figure 8:
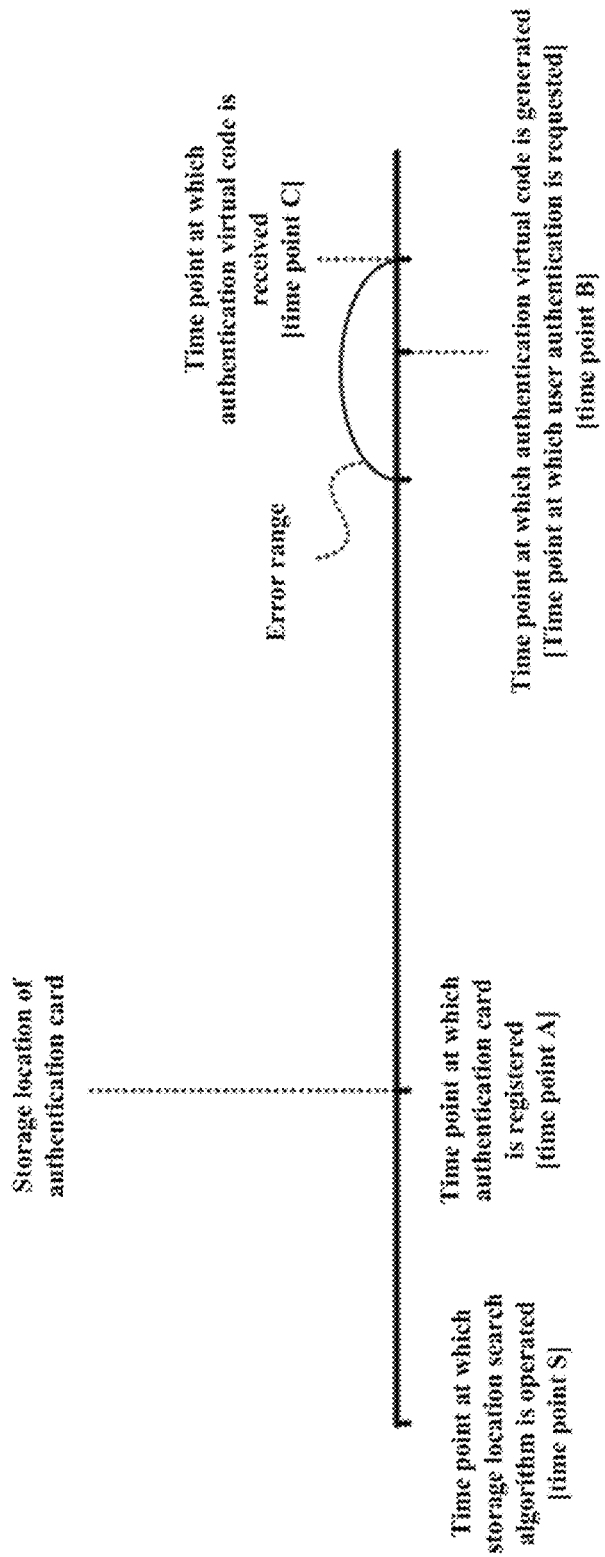
FIG. 8 is an exemplary view for describing verification of an authentication virtual code according to an embodiment of the inventive concept.

In an embodiment, referring to FIG. 8, the authentication virtual code verification unit 350 may compare a point in time when the authentication virtual code is received with a point in time when the authentication virtual code is generated by using the authentication virtual code generation function in the dedicated program built or installed in the user terminal. When the generation time is included within a preset error range from the reception time, the authentication virtual code verification unit 350 may determine that the received authentication virtual code is a normal code.

Furthermore, in another embodiment associated with a method of verifying an authentication virtual code, the first code and the second code may be codes for a reference count added by an OTP code generated randomly from a point in time when the authentication card is registered by the authentication virtual code generation means 20 or when user authentication is requested (e.g., a point in time when a user terminal receives authentication card data from an authentication card or a point in time when a user terminal generates an authentication virtual code by using the authentication card data).

As the detailed embodiment, the authentication virtual code generation device 200 generates the virtual security code by reflecting the virtual security code to the first code and the second code, without outputting the virtual security code to the outside.

The authentication virtual code generation means (e.g., a dedicated program to generate an authentication virtual code) generates a virtual security code value (e.g., OTP code) based on a part of a serial number (i.e., a unique value) in an authentication virtual code generation device (i.e., a user terminal) and the serial number of the authentication card or the combination of an authentication card serial number and a serial number of a dedicated program, generates the first code at a count, to which the virtual security code value is added, at a point in time when an authentication card is registered, and generates the second code at a count corresponding to the virtual security code value (i.e., generates the virtual security code itself as the second code). That is, the first code and the second code are generated by the authentication virtual code generation means 20 based on a count shifted by the virtual security code value from a time point 'A' at which the authentication card 10 is registered in the server 30. The count shifted from the time point 'A' may be a count earlier or later than a count corresponding to the current time point depending on the generated virtual security code value. The server that is the authentication virtual code verification means may apply the received first code and the received second code to a storage location search algorithm and then may search for a storage location (or a registration location) of the authentication card. In this way, it is impossible for other people to identify an order in which the first code and the second code constituting the authentication virtual code are provided, thereby improving security.

Furthermore, in another embodiment, after extracting the virtual security code from the second code generated based on the virtual security code, the server that is the authentication virtual code verification means may determine whether there is a value the same as the virtual security code among OTP numbers calculated by entering a count within a specific range from a count, at which an authentication virtual code is received, by means of a virtual security code generation function (i.e., an OTP function). The server that is the authentication virtual code verification means obtains the virtual security code value (i.e., an OTP function value) used to generate the second code by applying an inverse function of the second function to the second code and then searches for a count at which a value the same as the virtual security code value is calculated. As there is a difference between a time point at which the virtual security code is generated by the authentication virtual code generation means and a time point at which the authentication virtual code verification means receives the virtual security code due to the transmission time or delay of the authentication virtual code, a count at which the authentication virtual code verification means receives the authentication virtual code may not be identical to a count at which the OTP number corresponding to the virtual security code is generated, and thus the server allows an error range from a count at which the authentication virtual code is received. In this way, the server may prevent user authentication from being performed with the previously-generated authentication virtual code instead of the currently-generated authentication virtual code, thereby improving security. Moreover, even though a user does not enter a virtual security code of specific digits when the user enters the authentication virtual code, the server itself may search for the virtual security code and then may verify the user.

Also, in another embodiment, at a time point at which user authentication is requested, the authentication virtual code generation means generates the first code corresponding to a count, to which the virtual security code value generated using a part of a serial number (i.e., a unique value) in a user terminal or a dedicated program and a serial number of the authentication card or a combination of the serial numbers as seed data is added, and may generate the second code corresponding to a count obtained by adding the virtual security code value to a count difference between an authentication card registration time point (time point 'A') and a user authentication request time point (time point '6'). That is, equations in which a dedicated program to generate an authentication virtual code generates the first code and the second code are as follows.

First code=$f_1$(count at time point 'B'+virtual security code)

Second code=$f_2$(count at time point 'B'−count at time point 'A'+virtual security code)

(time point 'A': a time point at which an authentication card is registered, time point 'B': a count at a time point at which user authentication is requested, virtual security code: OTP number)

The server 30 that is the authentication virtual code verification means searches for a location, at which user information is stored, based on the first code and the second code in the received authentication virtual code and extracts the seed data (i.e., data used upon generating an authentication virtual code among a serial number of a dedicated program to generate an authentication virtual code or a user terminal, an authentication card serial number, and a combination serial number obtained by combining the serial number of the dedicated program to generate the authentication virtual code and the authentication card serial number) stored at the corresponding location. The server 30 generates a virtual security code (i.e., an OTP number) within a specific count range from a point in time, when a request for user authentication is received, based on seed data.

Afterward, as the server 30 searches for a point, at which user information is stored, based on the first code and the second code, the server 30 grasps the authentication card registration time point (time point 'A'). The server 30 calculates a calculation value corresponding to a sum of the number of counts to each count within a specific count range and the virtual security code (i.e., an OTP number), based on the time point at which a request for user authentication is received, from the authentication card registration time point (time point 'A') and determines whether there is a count the same as the number of counts (i.e., a value obtained by applying the inverse function of the second function to the second code) corresponding to the second code in each of the calculation values. In this way, the server 30 may determine whether the authentication virtual code is normally provided.

When verification of the authentication virtual code is completed by the authentication virtual code verification unit 350, the user authentication approval unit 360 approves the user authentication.

In an embodiment, in a case of the user authentication at the time of making a payment, a user is verified by the user authentication approval unit 360. When the verification of whether the authentication virtual code is normally generated is completed, the user authentication approval unit 360 transmits a message of user authentication approval to a financial company server. Accordingly, the financial company server may approve the user to proceed with a financial transaction.

In another embodiment, in a case of the user authentication at the time of access, when a user is verified by the user authentication approval unit 360 and the verification of whether the authentication virtual code is normally generated is completed, the user authentication approval unit 360 transmits a message of user authentication approval to a security system management server. Accordingly, the management server may authorize the user to enter a secure area.

Figure 5:
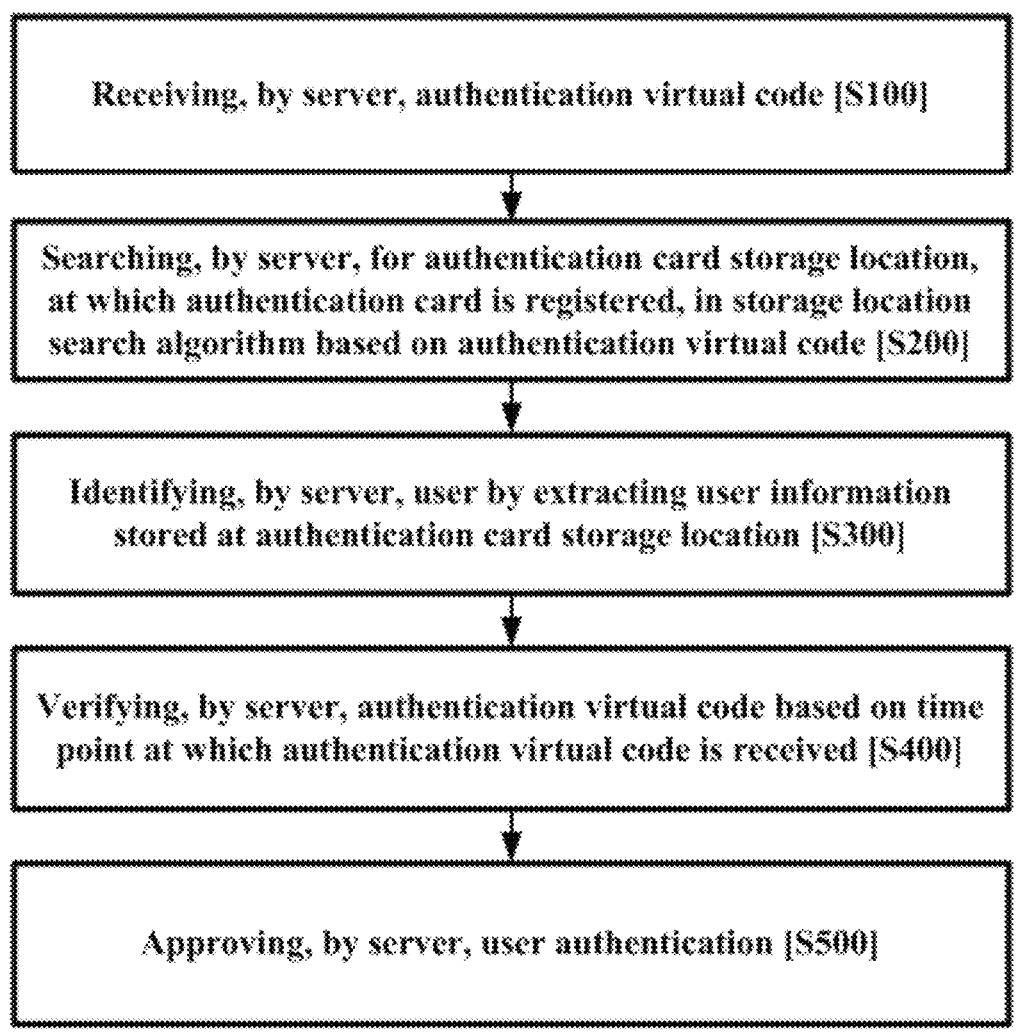
FIG. 5 is a flowchart of a user authentication method by using an authentication virtual code according to an embodiment of the inventive concept.

FIG. 5 is a flowchart of a user authentication method by using an authentication virtual code according to an embodiment of the inventive concept.

Referring to FIG. 5, according to an embodiment of the inventive concept, a user authentication method using an authentication virtual code includes operation S100 of receiving, by a server, the authentication virtual code (receiving an authentication virtual code), operation S200 of searching, by the server, for an authentication card storage location, at which the authentication card is registered, in a storage location search algorithm based on the authentication virtual code (searching for a storage location), operation S300 of identifying, by the server, a user by extracting user information stored after being matched with the found authentication card storage location, operation S400 of verifying, by the server, an authentication virtual code based on a time point at which the authentication virtual code is received, and operation S500 of approving, by the server, user authentication. Hereinafter, the detailed description of each operation is provided. However, the detailed disclosure of contents described in the description process associated with the authentication virtual code generation device 200 (i.e., the authentication virtual code generation means 20 including a dedicated program) and the authentication virtual code verification device 300 (i.e., the server 30) is omitted.

In operation S100, the server 30 receives a request for user authentication by receiving an authentication virtual code. Herein, the authentication virtual code is generated by an authentication virtual code generation function included in an authentication virtual code generation program based on authentication card data provided from an authentication card. The authentication card data is specific data assigned when the authentication card 10 is manufactured, and includes a card number of an authentication card, a serial number of an authentication card, or the like.

According to an embodiment, the authentication virtual code may be generated based on time data at which the authentication card data are provided to the authentication virtual code generation means 20 (i.e., an authentication virtual code generation program), or may be generated based on time data, at which user authentication is requested, by tagging the authentication card 10 to the authentication virtual code generation program.

According to another embodiment, the authentication virtual code may be generated based on a combination serial number obtained by combining an authentication card serial number included in the authentication card data and a program serial number (i.e., an application serial number) included in an authentication virtual code generation program.

The authentication virtual code generation means 20 may generate an authentication virtual code based on the time data and the combination serial number by using the authentication virtual code generation function included in the dedicated program. That is, the authentication virtual code may be generated by combining the time data and the combination serial number depending on a specific rule, and the generated authentication virtual code may be provided to the server 30.

In an embodiment, the authentication virtual code generation means 20 may generate each detailed code through the dedicated program, using an authentication card serial number, a dedicated program serial number (i.e., an application serial number), and a combination serial number obtained by combining the authentication card serial number and the dedicated program serial number as seed data of each detailed code generation function.

When generating a plurality of detailed codes by using each detailed code generation function, the authentication virtual code generation means 20 may generate the authentication virtual code in which the plurality of detailed codes are combined, using the detailed code combination function included in the authentication virtual code generation function. For example, the authentication virtual code generation means 20 may generate the authentication virtual code through the dedicated program, using the combination serial number generated by each detailed code and the time data, at which authentication card data is received, as seed data of the detailed code combination function.

In addition, the authentication virtual code may be generated in various manners. That is, the authentication virtual code may be generated by various authentication virtual code generation functions. The detailed description of generating the authentication virtual code in various manners is duplicated with the description given with reference to FIG. 3, and thus the detailed disclosure is omitted.

Afterward, in operation S200, the server 30 searches for an authentication card storage location, at which the authentication card 10 is registered in a storage location search algorithm, based on the authentication virtual code. Herein, the storage location search algorithm may be matched with the authentication virtual code generation function included in the dedicated program built or installed in the authentication virtual code generation means 20 (i.e., a user terminal), and may search for the authentication card storage location based on at least one detailed code in the authentication virtual code.

When the registration request of the authentication card 10 is received through the authentication virtual code generation means 20, the server 30 registers an authentication card at a specific point (count) corresponding to the requested time point in the storage location search algorithm for the corresponding authentication card and stores user information at the corresponding point. Herein, the user information refers to information of a card owner who has purchased or received an authentication card and has requested registration.

After the authentication card 10 is registered on the server 30, when the server 30 receives a request for user authentication by receiving the authentication virtual code through the authentication virtual code generation means 20, the server 30 may identify a user by extracting user information stored in the storage location search algorithm based on the received authentication virtual code.

In an embodiment, because the server 30 includes different storage location search algorithms for each type of authentication card 10, the server 30 determines the type of the requested authentication card and stores the authentication card in the proper storage location search algorithm. Furthermore, the user information (information of a user who holds an authentication card) is stored in the authentication card storage location in the storage location search algorithm.

According to an embodiment, when the authentication virtual code is generated by combining the first code and the second code, the server 30 searches for the authentication card storage location in the storage location search algorithm, using the first code and the second code. For example, the first code may be a code for setting a start point of the storage location search of the authentication card in the storage location search algorithm; the second code may be a code for setting a search path from the start point to the authentication card storage location in the specific search manner.

As illustrated in FIG. 6, the server 30 sets the location corresponding to the first code to the start point and searches for the authentication card storage location or a point (i.e., the specific vertex of a k-polygon) matched to the authentication card storage location in the placement state of the k-polygon, based on the second code in the search manner applied to the second code. The storage location is matched to each vertex of the k-polygon. The point at which the first code track (i.e., a first track) corresponds to the k-polygon is the start point of the storage location search corresponding to the first code. The server 30 searches for the matching point of the authentication card storage location, at the search start point based on the second code.

Various methods may be applied to the method of searching for a storage location in the k-polygon based on the second code. For example, the server 30 allows an angle to be changed to an angle (e.g., a specific angle obtained by dividing 180 degrees into MN pieces so as to face the vertex of the k-polygon) corresponding to a second code at the location, which the k-polygon contacts, on the first track, the server 30 may search for a vertex of the k-polygon that is a storage location, at which the authentication card is stored, based on the authentication virtual code.

Furthermore, for another example, in a state where the k-polygon is in contact with the point corresponding to the first code on the first track, the server 30 divides the whole central angle (i.e., 360 degrees) into MN pieces based on the center of the k-polygon and the contact point on the first track, and matches each angle to MN second codes. At this time, the direction of the line moving by unit angles (i.e., 360 degrees/MN) of specific numbers from the line connecting the center of the k-polygon to the contact point on the first track faces the specific vertex of the k-polygon. Accordingly, when the second code corresponding to the specific angle is received, the server 30 may search for the vertex positioned in the corresponding angle direction.

Furthermore, for another example, the specific digit of the second code may be used to determine an angle calculation direction. That is, when the second code is generated using 'N' ('N' is a natural number) characters, the angle measurement direction may be determined with one digit. For example, when the server 30 divides the whole central angle (i.e., 360 degrees) into MN pieces based on the center of the k-polygon and the contact point on the first track and matches the second code to each angle, the server 30 may determine whether the angle is an angle measured to the right from the line connecting the center of the k-polygon to the contact point on the first track or whether the angle is an angle measured to the left.

For example, the storage location search algorithm may assign two second codes different from each other depending on the angle measurement direction at each vertex on the k-polygon, to one vertex. That is, the second codes different from each other in the arrival with the interior angle and the arrival with the exterior angle may be matched to the one vertex and may be connected to the storage location of another authentication card. For another example, when the second code is generated using 'N' ('N' is a natural number) characters, the storage location search algorithm may match (N−1) characters with half of the total angle (e.g., 360 degrees in the case where the total angle is divided based on the center angle) and may determine the angle application direction for reaching each vertex, using one digit.

The method of searching for a storage location in the k-polygon based on the second code is not limited thereto; various methods such as the method of searching for a point for dividing space between the point on the k-polygon corresponding to the second code and the contact point on the first track at a specific ratio, as the storage location may be applied.

According to another embodiment, when the authentication virtual code includes the first code and the second code that are changed for each unit count, the first code is generated based on an unit count elapsed from the first time point at which the server 30 starts the issuance of an authentication card, and the second code is generated based on an unit count elapsed from a time point at which each user registers the authentication card through the dedicated program installed in the authentication virtual code generation means 20. At this time, the unit count is set to a specific time interval and is changed as a time interval elapses.

Figure 7:
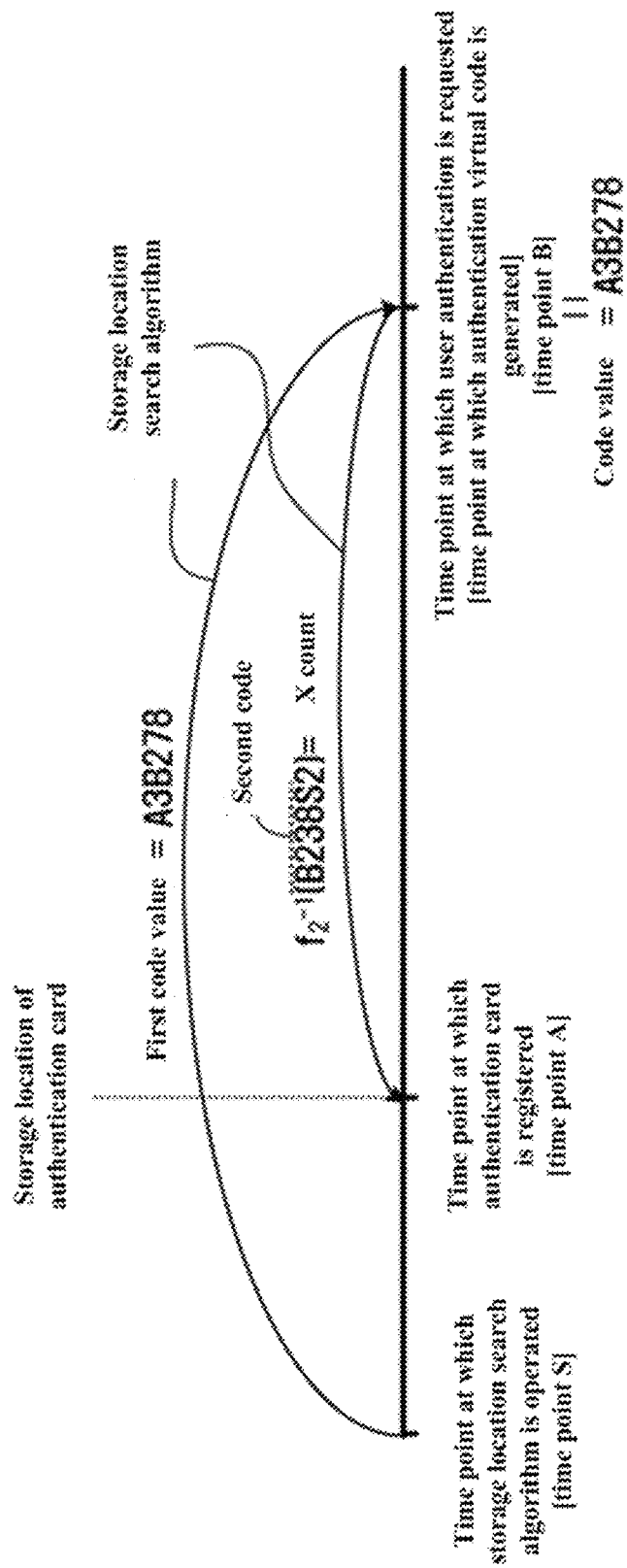
FIG. 7 is an exemplary view illustrating a storage location search algorithm searching for a storage location of an authentication card while the storage location is moved on a track based on a detailed code, according to an embodiment of the inventive concept.

As illustrated in FIG. 7, the storage location search algorithm is moving to a point matched to a storage location of an authentication card while moving on a track based on a plurality of detailed codes constituting the authentication virtual code.

In particular, as a specific company provides an authentication card-based service, when the authentication virtual code includes the first code generated based on a unit count that has elapsed from an initial time point at which the storage location search algorithm is started, and the second code generated based on a unit count that has elapsed from a time point, at which the authentication card 10 of each user is registered, as illustrated in FIG. 7, the server 30 sets a count on a track to which a code value corresponding to the first code is matched, to a search start point and returns along the track from the search start point by the count value corresponding to the second code to search for a point (i.e., an authentication card storage location) on a track at the time point at which the authentication card 10 is registered in the server 30. For example, the server 30 searches for a point (or count), to which the first code in the authentication virtual code is assigned, on a track for the first code to set the search start point, reversely positions a track for the second code from the search start point, searches for a point (or count), to which the second code in the authentication virtual code is assigned, and extracts a point (or count), at which an authentication card is registered, on the track for the first code. Furthermore, for example, as the server 30 sets the search start point based on the first code in the authentication virtual code, returns by a count value calculated as the inverse function of the second function is applied to the second code in the authentication virtual code, and searches for the point corresponding to an authentication card registration time point.

Afterward, in operation S300, the server 30 identifies a user by extracting user information stored after being matched with the found authentication card storage location. That is, after the authentication card 10 is registered on the server 30, when the server 30 receives a request for user authentication by receiving the authentication virtual code through the authentication virtual code generation means 20, the server 30 may identify a user by extracting user information stored in the storage location search algorithm based on the received authentication virtual code.

In detail, the server 30 extracts user information that is stored after being matched with the storage location of the found authentication card. That is, the server 30 may store the user information for using the corresponding authentication card at each authentication card storage location in the storage location search algorithm, and thus the server 30 may extract specific user information that is stored after being matched with a storage location of a specific authentication card within the storage location search algorithm.

Afterward, in operation S400, the server 30 verifies an authentication virtual code based on a time point at which the authentication virtual code is received. In detail, the server 30 may compare a time point, at which the received authentication virtual code is received, with a time point, at which the authentication virtual code generated by using an authentication virtual code generation function is generated by the authentication virtual code generation program, and, as illustrated in FIG. 8, may determine that the received authentication virtual code is a normal code when the generation time point is included within an error range from the reception time point.

In an embodiment, when performing user authentication during financial transaction, the server 30 may determine whether a user requesting user authentication during financial transactions has requested user authentication at a current time by using his/her authentication card, by comparing the reception time of the authentication virtual code with the generation time of the authentication virtual code in the storage location search algorithm.

In an embodiment, when performing user authentication during a request for access, the server 30 may determine whether a user requesting user authentication during the request for access has requested user authentication at a current time by using his/her authentication card, by comparing the reception time of the authentication virtual code with the generation time of the authentication virtual code in the storage location search algorithm.

For example, when a user requests user authentication by using a user terminal, the dedicated program built or installed in a user terminal generates an authentication virtual code (in particular, the second code) based on a count value corresponding to the request time point (i.e., a generation time point), using the authentication virtual code generation function. In an embodiment, one detailed code (e.g., the second code) among a plurality of detailed codes may be generated by using an OTP function that uses the generation time point as seed data. That is, the OTP code may be included and generated in the second code.

Afterward, the generated authentication virtual code is provided to the server. The server extracts a plurality of detailed codes by using an authentication virtual code generation function or a storage location search algorithm matched with the authentication virtual code generation function. Moreover, the OTP code is extracted through one detailed code (e.g., the second code) among the plurality of detailed codes, and a point in time when the authentication virtual code is generated is extracted through the OTP code.

Afterward, the server may verify whether the authentication virtual code is a code generated at a current time point, by comparing a time point, at which the authentication virtual code is received, with a time point at which the authentication virtual code is generated by the user terminal. That is, when the generation time point of the authentication virtual code is included within a range including a preset count value from the time point at which the authentication virtual code is received, the server verifies that the authentication virtual code is the code generated at the current time.

In operation S500, the server 30 completes user authentication by determining that the authentication virtual code is a normal code, when the time point at which the authentication virtual code is generated is included within a specific range from the reception time point.

In an embodiment, in a case of the user authentication during financial transactions, when a user is verified by the server 30 and the verification of whether the authentication virtual code is normally generated is completed, the server 30 transmits a message of user authentication approval to a financial company server. Accordingly, the financial company server may approve the user to proceed with a financial transaction. In another embodiment, in a case of the user authentication at the time of a request for access, when a user is verified by the server 30 and the verification of whether the authentication virtual code is normally generated is completed, the server 30 transmits a message of user authentication approval to a security system management server. Accordingly, the management server may authorize the user to enter a secure area.

According to an embodiment of the inventive concept, a user authentication method using an authentication virtual code may further include registering, by the server, an authentication card by using authentication card data and user information of a user holding the authentication card.

In other words, the server 30 may search for a specific authentication card storage location in the storage location search algorithm based on a point in time when the registration of the authentication card is requested by the user, may store user information (i.e., information about a user holding an authentication card) that has requested registration of an authentication card at the found authentication card storage location, and thus may register the authentication card. At this time, the user information may be information directly input by a user through a user terminal, in which an authentication virtual code generation program is built or installed, and may be information generated based on user login information of a dedicated program to generate an authentication virtual code. At this time, in an embodiment, before the authentication card is issued to a user, the authentication card to be issued is registered in a server in advance. Afterward, when a user receives the corresponding authentication card and requests use registration through a dedicated program built in or installed in a user terminal, the authentication card is activated in a server. A count is assigned to the activated card within the authentication virtual code generation function, and thus a user may request user authentication using the corresponding authentication card.

In detail, the dedicated program receives authentication card data including a serial number or an authentication card number from the authentication card 10 upon registering an authentication card. Furthermore, upon registering an authentication card, the dedicated program receives user information from the user or generates the user information based on the user's login information of the dedicated program. Afterwards, the dedicated program transmits the authentication card number and the user information to the server 30. As the server 30 registers the authentication card 10 at a specific count, the dedicated program receives an authentication virtual code generation function or setting data for specifying the authentication virtual code generation function, from the server 30. In this way, the dedicated program includes an authentication virtual code generation function for generating an authentication virtual code capable of searching for a specific count at which an authentication card is registered in the server 30.

In an embodiment, when the authentication card is an authentication card used for financial transactions, the server 30 receives a registration request from the dedicated program included in a user terminal. That is, the user receives the authentication card 10 from a financial company, and registers the authentication card 10 in the dedicated program built or installed in the authentication virtual code generation means 20. The dedicated program registers the authentication card 10 in the server 30 by transmitting authentication card data and user information to the server 30.

For example, a card issuer may register the corresponding card in a card issuer server before issuing a credit card to a user. Afterward, when a registration request is received by the user, the card issuer may activate the corresponding card. Accordingly, the user may also make general financial transactions, using an authentication card for financial transactions, and may also perform user authentication during financial transactions.

For example, a case that the user makes a general financial transaction by using an authentication card for financial transactions is the same as a case that the user makes a payment by using a credit card (or a check card) when the user makes an offline purchase. On the other hand, when a user performs user authentication for online banking or the like by using an authentication card for financial transactions, the user may tag the authentication card for financial transactions to a user terminal, and may allow the dedicated program built or installed in the user terminal to generate an authentication virtual code. Afterward, the user may complete user authentication by using the generated authentication virtual code.

In another embodiment, when the authentication card is an authentication card used at the time of a request for access, the server 30 receives a registration request from the dedicated program included in the user terminal. That is, the user receives the authentication card 10 from an administrator that manages a secure area or system, and registers the authentication card 10 in the dedicated program built or installed in the authentication virtual code generation means 20. The dedicated program registers the authentication card 10 in the server 30 by transmitting authentication card data and user information to the server 30.

For example, before issuing a pass to an employee, a company may register the corresponding pass in a company server. Afterward, when a registration request is received by the employee, the company may activate the corresponding pass. Accordingly, the user may also perform general access, using an authentication card for access, and may also perform user authentication when the user accesses a secure area.

For example, when the user performs general access by using an authentication card for access, the user may perform access to a specific space by tagging the authentication card to an access device. On the other hand, in the case where a user performs user authentication to access a secure area by using an authentication card for access, when the user enters an offline space that requires secure access, the user may tag the authentication card for access to the user terminal in which a dedicated program is executed, and then may receive an approval to enter the offline space by outputting an authentication virtual code generated in the dedicated program as NFC, QR code, or the like. Also, when a user logs in to an online system that requires secure access, the user may log in by directly entering an authentication virtual code generated through tagging of the access authentication card into the corresponding page.

A user authentication method using an authentication virtual code according to an embodiment of the inventive concept may be implemented by a program (or an application) and may be stored in a medium such that the program is executed in combination with a computer being hardware.

The above-described program may include a code encoded by using a computer language such as C, C++, JAVA, Ruby, a machine language, or the like, which a processor (CPU) of the computer may read through the device interface of the computer, such that the computer reads the program and performs the methods implemented with the program. The code may include a functional code related to a function that defines necessary functions that execute the method, and may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Moreover, when the processor of the computer needs to communicate with any other remote computer or any other remote server to perform the functions, the code may further include a communication-related code associated with how to communicate with any other remote computer or server using the communication module of the computer, what information or media should be transmitted or received during communication, or the like.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distributed manner.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

The invention claimed is:

1. A user authentication method using an authentication virtual code, the method comprising:
  receiving, by a server, a user authentication request and the authentication virtual code, wherein the authentication virtual code is generated by an authentication virtual code generation function included in an authentication virtual code generation program based on authentication card data provided from an authentication card;
  searching, by the server, for an authentication card storage location, at which the authentication card is registered, in a storage location search algorithm based on the authentication virtual code, wherein the storage location search algorithm is matched with the authentication virtual code generation function and searches for the authentication card storage location based on at least one detailed code in the authentication virtual code;
  identifying, by the server, a user by extracting user information stored after being matched with the authentication card storage location that is searched by the server;
  verifying, by the server, the authentication virtual code, by comparing a reception time point, at which the server receives the authentication virtual, with a generation time point, at which the authentication virtual code is generated by using the authentication virtual code generation function; and
  approving, by the server, user authentication when the comparison result indicates that the generation time point is within an error range from the reception time point.

2. The method of claim 1, wherein the authentication virtual code is generated based on time data at which the authentication card data included in the authentication card is provided to the authentication virtual code generation program, or time data at which the user authentication is requested by tagging the authentication card to the authentication virtual code generation program.

3. The method of claim 2, wherein the authentication virtual code is generated based on a combination serial number obtained by combining an authentication card serial number included in the authentication card data and a serial number included in the authentication virtual code generation program.

4. The method of claim 1, further comprising:
  registering, by the server, the authentication card by using the authentication card data and user information of a user holding the authentication card,
  wherein the registering of the authentication card includes:
  searching, by the server, for a specific authentication card storage location within the storage location search algorithm based on an authentication card registration time point; and
  storing the user information at the authentication card storage location that is searched by the server, to complete registration.

5. The method of claim 1, wherein the authentication virtual code includes a first code and a second code that are changed for each unit count set to a specific time interval,
  wherein the first code is generated based on a unit count elapsing from a first time point at which the server starts an issuance of the authentication card, and
  wherein the second code is generated based on a unit count elapsing from a time point at which the authentication card of a specific user is registered.

6. A non-transitory computer-readable recording medium storing a computer program, and configured to be coupled to a computer hardware, the program includes instructions to execute the method of claim 1.

7. An authentication virtual code verification device for user authentication, the authentication virtual code verification device comprising:
- an authentication virtual code reception unit configured to receive an authentication virtual code and to receive a request for the user authentication;
- a detailed code extraction unit configured to extract one or more detailed codes included in the authentication virtual code;
- a storage location search unit configured to search for an authentication card storage location, at which an authentication card is registered in a storage location search algorithm, based on the extracted one or more detailed codes;
- a user information extraction unit configured to identify a user by extracting user information stored after being matched with the authentication card storage location that is searched by the storage location search unit;
- an authentication virtual code verification unit configured to compare a time point, at which the authentication virtual code reception unit receives the authentication virtual code, with a time point, at which the authentication virtual code is generated by using an authentication virtual code generation function by an authentication virtual code generation means, and to verify the authentication virtual code; and
- a user authentication approval unit configured to approve the user authentication when verification of the authentication virtual code is completed,
- wherein, when it is identified by the authentication virtual code verification unit that the generation time point is within an error range from the reception time point, and it is determined that the authentication virtual code is a normal code, the user authentication is approved by the user authentication approval unit, and
- wherein the storage location search algorithm is matched with the authentication virtual code generation function.

8. The device of claim 7, wherein the authentication virtual code is generated based on time data at which an authentication card data included in the authentication card is provided to an authentication virtual code generation program, or time data at which the user authentication is requested by tagging the authentication card to the authentication virtual code generation program.

9. The device of claim 8, wherein the authentication virtual code is generated based on a combination serial number obtained by combining an authentication card serial number included in the authentication card data and a serial number included in the authentication virtual code generation program.

10. The device of claim 7, wherein the authentication virtual code verification device is further configured to:
- register the authentication card by using an authentication card data and user information of a user holding the authentication card,
- search for a specific authentication card storage location within the storage location search algorithm based on an authentication card registration time point; and
- store the user information at the authentication card storage location that is searched by a server, to complete registration.

11. The device of claim 7, wherein the authentication virtual code includes a first code and a second code that are changed for each unit count set to a specific time interval, wherein the first code is generated based on a unit count elapsing from a first time point at which a server starts an issuance of the authentication card, and
wherein the second code is generated based on a unit count elapsing from a time point at which the authentication card of a specific user is registered.

12. An authentication card device for user authentication, the authentication card device comprising:
- an integrated circuit (IC) chip including authentication card data; and
- a communication unit configured to provide the authentication card data to an authentication virtual code generation means through wireless communication,
- wherein the authentication card data is specific data assigned to the authentication card device when the authentication card device is manufactured,
- wherein the authentication virtual code generation means generates an authentication virtual code based on the provided authentication card data by using an authentication virtual code generation function and provides the generated authentication virtual code to a server,
- wherein the server receives a user authentication request and the authentication virtual code, and searches for an authentication card storage location, at which the authentication card device is registered, in a storage location search algorithm matched with the authentication virtual code generation function based on the provided authentication virtual code, and extracts user information stored after being matched with the authentication card storage location to identify a user, and
- wherein the server verifies the authentication virtual code, by comparing a reception time point, at which the server receives the authentication virtual code, with a generation time point, at which the authentication virtual code generation means generates the authentication virtual code, and approves the user authentication when the comparison result indicates that the generation time point is within an error range from the reception time point.

13. The device of claim 12, further comprising:
- a determination unit configured to distinguish between a tag for payments and a tag for the user authentication when the authentication card device includes a card for the payments,
- wherein the communication unit provides a payment terminal with card information for the payments included in the IC chip when the tag for the payments is determined by the determination unit, and
- wherein the communication unit provides the authentication virtual code generation means with the authentication card data for generating the authentication virtual code when the tag for the user authentication is determined by the determination unit.

14. The device of claim 12, further comprising:
- a determination unit configured to distinguish between a tag for access and a tag for the user authentication when the authentication card device is used as a card for access,
- wherein the communication unit provides an access terminal with identification information for the access included in the IC chip when the tag for the access is determined by the determination unit, and
- wherein the communication unit provides the authentication virtual code generation means with the authentication card data for generating the authentication virtual code when the tag for the user authentication is determined by the determination unit.

* * * * *